United States Patent
Bourdariat et al.

(10) Patent No.: US 8,567,824 B2
(45) Date of Patent: Oct. 29, 2013

(54) POLYMER DUCT HAVING CLAMPING COLLAR

(75) Inventors: Antoine Bourdariat, Chalette sur Loing (FR); Jochen Gaa, Mannheim (DE); Alper Caliskan, Saint Jean de la Ruelle (FR)

(73) Assignee: Hutchinson, Paris (FR)

( * ) Notice: Subject to any disclaimer, the term of this patent is extended or adjusted under 35 U.S.C. 154(b) by 173 days.

(21) Appl. No.: 12/954,817

(22) Filed: Nov. 26, 2010

(65) Prior Publication Data

US 2011/0127765 A1 Jun. 2, 2011

(30) Foreign Application Priority Data

Nov. 30, 2009 (FR) ...................................... 09 05750

(51) Int. Cl.
*F16L 33/207* (2006.01)
(52) U.S. Cl.
USPC ........................... 285/253; 285/252; 24/274 R
(58) Field of Classification Search
USPC ......... 24/274 WB, 274 R, 279; 285/252, 253, 285/23
See application file for complete search history.

(56) References Cited

U.S. PATENT DOCUMENTS

| 5,504,978 | A | * | 4/1996 | Meyer, III | 24/274 R |
| 5,956,817 | A | * | 9/1999 | Chen | 24/274 R |
| 6,773,037 | B2 | * | 8/2004 | Spurgat | 285/23 |
| 7,422,245 | B2 | * | 9/2008 | Norman et al. | 285/23 |
| 2002/0060453 | A1 | | 5/2002 | Spurgat | |
| 2005/0052020 | A1 | | 3/2005 | Butler | |
| 2008/0201913 | A1 | | 8/2008 | Holt et al. | |

FOREIGN PATENT DOCUMENTS

| FR | 2 882 420 A1 | 8/2006 |
| FR | 2 898 957 A1 | 9/2007 |
| WO | WO 2007/030059 A1 | 3/2007 |

OTHER PUBLICATIONS

French Preliminary Search Report issued Aug. 20, 2010, in French 0905750, filed Nov. 30, 2010 (with English Translation of Category of Cited Documents).

* cited by examiner

*Primary Examiner* — James Hewitt
(74) *Attorney, Agent, or Firm* — Oblon, Spivak, McClelland, Maier & Neustadt, L.L.P.

(57) ABSTRACT

A polymer duct configured to be connected to a nozzle of a system for transporting a fluid has a circumferential groove into which is mounted a clamping collar configured to clamp the duct against the nozzle, the groove being delimited by two lateral rims comprising radially projecting lateral studs with which the collar cooperates to be rotationally blocked relative to the duct. The collar has a circumferential clamping strip having two ends which overlap in an overlap region of the strip, a strip clamping member and a non-metallic blocking cover having an abutment portion. The abutment portion has a pair of lateral fins which extend in the radial and axial directions and abut against axial and lateral faces of the lateral studs.

8 Claims, 2 Drawing Sheets

POLYMER DUCT HAVING CLAMPING COLLAR

BACKGROUND OF THE INVENTION

The present invention relates to a clamping collar suitable for fitting in a circumferential groove of a polymer duct to be connected to a nozzle for the transportation of a fluid, such a duct fitted with this collar and a method for blocking the rotation of this collar on this duct. The invention applies in particular to a pressurized hot air duct for a motor vehicle of a type made of plastic material and requiring a fitted metal collar, such as an outlet duct from a flow meter, supercharging air cooler or turbocharger, as nonlimiting examples.

Clamping collars intended to clamp a duct so it can be connected to a nozzle of a fluid transport system generally consist of a metal clamping strip fitted with a cage with a screw, also metal, forming the clamping member of this collar on a receiving groove of the duct. Once the collar is mounted in the groove, its rotational blocking relative to the duct is generally provided by the abutment of this cage against two short axial abutments projecting toward the interior of the groove from its respective rims.

A major drawback in the rotational blocking of known clamping collars lies in the inadequate nature of this blocking due to the small contact area between the collar and the duct receiving it.

Other drawbacks in the rotational blocking of these collars lie, on the one hand, in the risk of the holing of the duct made of plastic material by the metal cage of the collar leading to potential leaks of the fluid transported by this duct and, on the other hand, in the need to provide a minimum thickness for the groove rims in the abutment region and provide an accurate reclamping of the collar when it is fitted. In particular, use is usually made of greater thicknesses of plastic material in these rims to minimize their risk of holing by the cage which, in addition to the extra cost incurred for the manufacture of the duct, hampers the leak-tightness of the connection and also the fitting forces required.

The document FR A1 2 882 420 teaches rotationally blocking such a clamping collar between two abutments formed on one and the same lateral rim of the groove receiving it, via a metal blocking portion of square shape which extends axially, tangentially relative to the clamping strip, from the screw cage to which it is joined or from which it is distinct.

A major drawback of the collar equipping the duct according to this document is that the abovementioned risk of holing of the duct remains, given that the rotational blocking is obtained by a contact between the metal material of this blocking portion and the two groove rim abutments concerned. Another drawback in the blocking produced in this document lies in the large thickness of plastic material required to produce these two abutments, with the resulting abovementioned drawbacks.

SUMMARY OF THE INVENTION

One aim of the present invention is to propose a clamping collar suitable for fitting in a circumferential groove of a polymer duct to be connected to a nozzle for the transportation of a fluid, this collar remedying all the abovementioned drawbacks and comprising:
- a circumferential clamping strip, two ends of which overlap in an overlap region of the strip having two radially internal and external overlapping faces,
- a strip clamping member mounted in contact with said overlapping faces, and
- a rotation blocking means mounted on the clamping member and capable of blocking the rotation of the collar in the groove by the rotational abutment of this blocking means against at least one lateral rim of said groove.

To this end, a collar according to the invention is such that this blocking means, non-metallic, bears on said external overlapping face and covers the clamping member radially outside this face.

It will be noted that this covering of the clamping member by this non-metallic blocking means makes it possible to avoid any risk of holing of the polymer duct, which advantageously makes it possible to use a reduced thickness for the or each groove rim involved in this rotational blocking with consequentially reduced manufacturing cost and fitting forces.

According to another feature of the invention, the blocking means may comprise an abutment portion regarding said at least one lateral rim of said groove, this abutment portion comprising at least one axial fin designed to abut in rotation against an axial face of a stud radially projecting from said at least one rim.

It will be noted that the or each abutment portion thus formed on the blocking means makes it possible to provide this rotational blocking with enhanced precision and reliability, by comparison to the abovementioned known ducts with groove rims each incorporating the abovementioned short axial abutment, by virtue of the greater contact surface area between the or each axial fin according to the invention and the stud of the corresponding groove rim.

Preferably, said abutment portion comprises at least one pair of said axial fins in the form of substantially square or trapezoidal wings, which each extend in a plane defined by the radial and axial directions of the clamping strip and which are symmetrical to one another in relation to the meridian plane of this strip in the circumferential direction.

It should be noted that these two axial fins, which are formed laterally on either side of the blocking means according to the invention to abut against the two studs facing the groove rims, thus provide a uniform clamping of the collar on the duct.

According to another preferential feature of the invention, the blocking means is clipped onto the clamping member formed by a cage with a screw. Advantageously, this blocking means comprises a clipping portion which is clipped onto a convex surface of the cage substantially in the form of an arc of cylinder, and defining a radially external part of this member.

Even more advantageously, said clipping portion may be formed at one end of the blocking means, which end is, intended to be adjacent to the head of the screw, and has an inverted U shape with two deformable clipping lips. This clipping portion may be separated from said pair of axial fins by a pair of notches ensuring the mechanical decoupling of this clipping portion with said abutment portion.

According to another feature of the invention, the blocking means may also include, at its other end intended to be adjacent to the stem end of the screw (4), an immobilization portion (9) in the circumferential direction which is capable of immobilizing this blocking means relative to the clamping member (3) by abutting against this stem end.

According to another feature of the invention, the blocking means may consist of a lid or cover produced in a single piece in a plastic material, preferably in an injection-molded thermoplastic material.

A polymer duct according to the invention, preferably made of plastic material, intended to be connected to a nozzle of a system for transporting a fluid, such as air, this duct including at least one circumferential groove receiving a clamping collar intended to clamp the duct against the nozzle, the groove being delimited by two lateral rims including radially projecting studs with which the collar is intended to cooperate so as to be blocked rotation-wise on the duct, is characterized in that this collar is as defined above.

A method for blocking the rotation, according to the invention, of a clamping collar as defined hereinabove, on a polymer duct intended to be connected to a nozzle of a fluid transport system, this duct including at least one circumferential groove for receiving the collar which is delimited by two lateral rims including radially projecting studs with which the collar is intended to cooperate so as to be blocked rotation-wise, comprises the following steps:

a) said clamping strip provided with said clamping member is positioned in the groove by adjusting the tightness of this strip by operating this member, then
b) said non-metallic blocking means is fitted, preferably clipped, onto this member so that this blocking means abuts against at least one of said studs while covering this member radially outside said radially external overlapping face.

Advantageously, in the step b), said blocking means can be immobilized in the circumferential direction relative to said clamping member, by an abutment of a screw stem that this member includes.

BRIEF DESCRIPTION OF THE DRAWINGS

Other features, advantages and details of the present invention will emerge from reading the following description of an exemplary embodiment of the invention, given as an illustrative and nonlimiting example, the description being given with reference to the appended drawings, in which.

DETAILED DESCRIPTION OF THE PREFERRED EMBODIMENT

Figure 1:
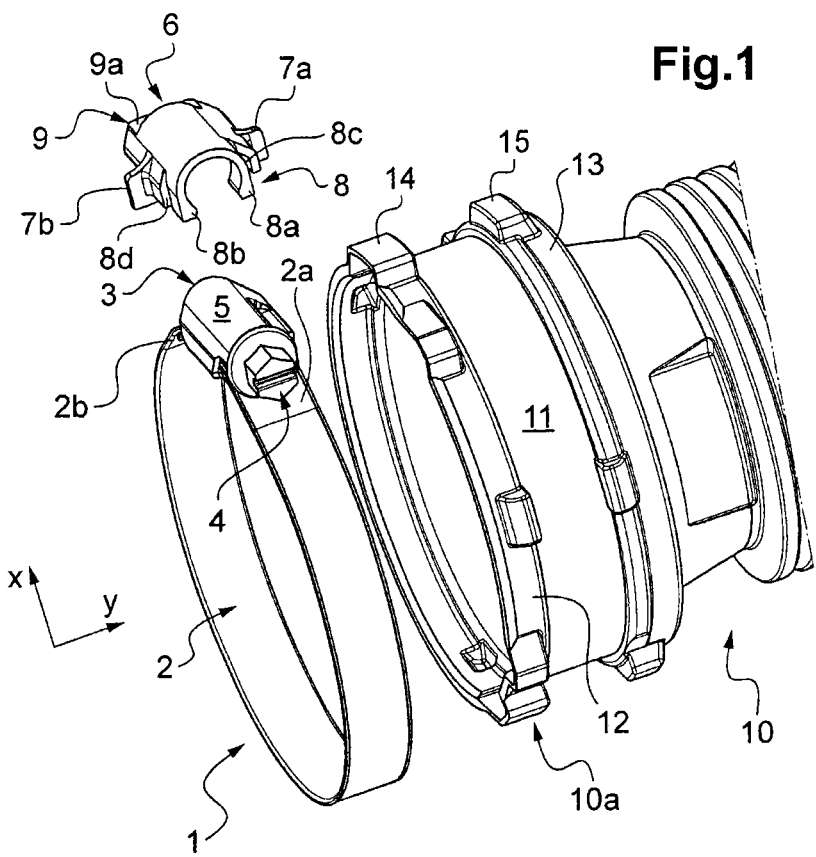
FIG. 1 is an exploded perspective view of a clamping collar according to the invention on which said blocking means is designed to be added after the collar has been fitted on a connecting duct (partially represented)

The collar 1 illustrated in FIG. 1 is intended to clamp a polymer duct 10, for example made of blown thermoplastic material, onto a connecting nozzle (not illustrated) of a system for transporting a fluid, such as hot air under pressure at the outlet of a flow meter, of a supercharging air cooler or of a turbocharger, for example.

This collar 1 comprises, as is known, a flexible and metallic annular clamping strip 2, one end 2a of which is provided with a clamping member 3, also metallic, which is designed to receive a variable length of the other end 2b of the strip 2 so as to reduce or increase the diameter of the strip 2 by actuation of this clamping member 3 in one direction or in the other, respectively. As can be seen in FIG. 1, the two strip ends 2a and 2b thus mutually overlap in an overlapping region having a radially external face defined by the strip end 2a and a radially internal face defined by the strip end 2b. The clamping member 3 is, in this example, formed by a screw cage comprising a screw 4 extending tangentially to the strip 2 and housed in a cage-forming roughly semicylindrical jacket 5.

The globally tubular flexible duct 10 which is illustrated in FIG. 1 comprises, at at least one of its ends 10a, a groove 11 for receiving the clamping collar 1 which is designed for it to be positioned axially in a circumferential placement of the duct 10 via two circumferential rims or flange 12 and 13 axially delimiting the groove 11. Each lateral rim 12, 13 is provided with at least one stud 14, 15, substantially parallelepipedal or of trapezoidal section for example, which protrudes radially outward, and of which one axial face (defined by the two directions, radial X and axial Y) is intended to serve as an abutment for the collar 1 in the circumferential direction, as explained hereinbelow.

To this end, the collar 1 comprises a cover or lid 6 so as to be blocked rotation-wise on the duct 10, that is mounted on the clamping member 3 of the collar 1 after the latter has been positioned with the desired tightness in the groove 11 of the duct 1. The cover 6 is preferably made of a single piece out of injection-molded thermoplastic material (such as, for example, a polypropylene or a polyamide), and it is clipped onto the cage 5 of the collar 1, bearing on the strip 2, so that this cover 6 covers this cage 5 and in turn ensures, by its two axial fins 7a and 7b, this rotational blocking against the two abutment-forming facing studs 14 and 15 of the groove rims 12 and 13. More specifically, and as can be seen in FIGS. 1 to 3, the cover 6 has, essentially, from one of its ends to the other (in the circumferential direction):

a clipping portion 8 which is intended to be mounted adjacent to the head of the screw 4 and which has an inverted U shape with two deformable clipping lips 8a and 8b, a substantially median abutment portion for the cover 6, which comprises the two fins 7a and 7b, in the form of trapezoidal wings for example, extending laterally, while being symmetrical to one another relative to the median circumferential plane of the strip 2 and of the cover 6, which is separated from the clipping lips 8a and 8b by two respective notches 8c and 8d ensuring the mechanical decoupling of the clipping portion 8 from the abutment portion 7a, 7b, and an immobilization portion 9 in the circumferential direction which is intended to be adjacent to the stem end 4b of the screw 4 (opposite to its head 4a), and which is able to immobilize the cover 6 on the screw cage 3 by abutting against this stem end 4b.

As illustrated in FIG. 1, the two clipping lips 8a and 8b define between them a minimum axial width for the cover 6 so as to grip it effectively, in comparison to the width of the cover 6—substantially constant—measured beyond the notches 8c and 8d (both before and beyond the fins 7a and 7b).

Figure 2:
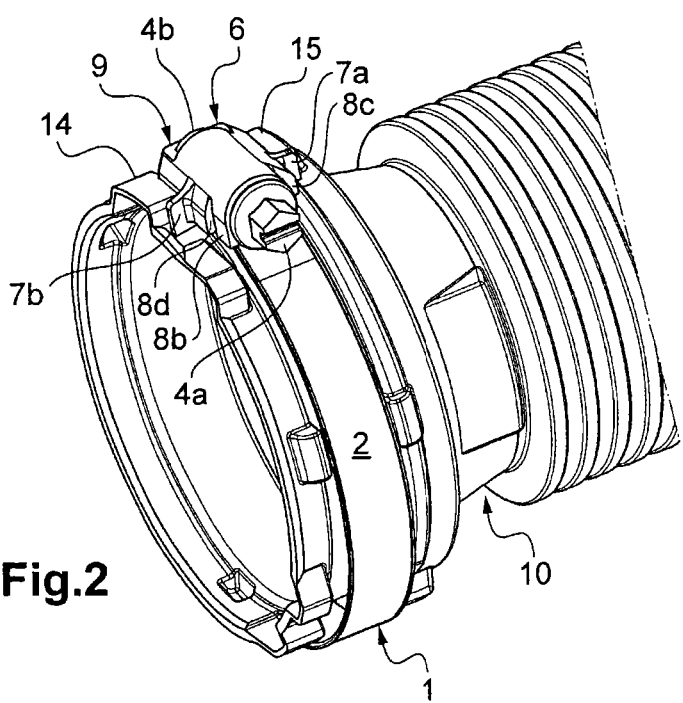
FIG. 2 is an assembled perspective view of the clamping collar of FIG. 1 fitted on this same duct and incorporating this blocking means.
Figure 3:
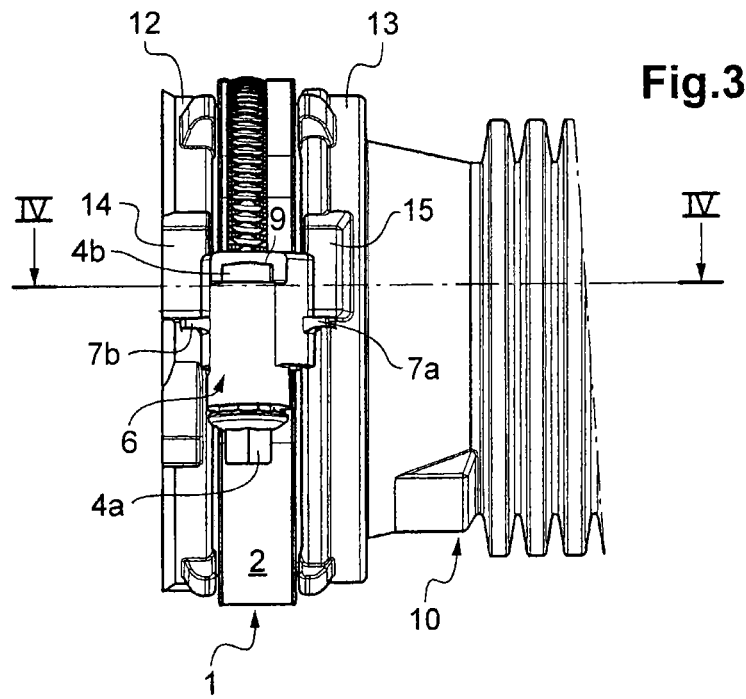
FIG. 3 is a front view of the duct of FIG. 2 equipped with this clamping collar according to the invention.
Figure 4:
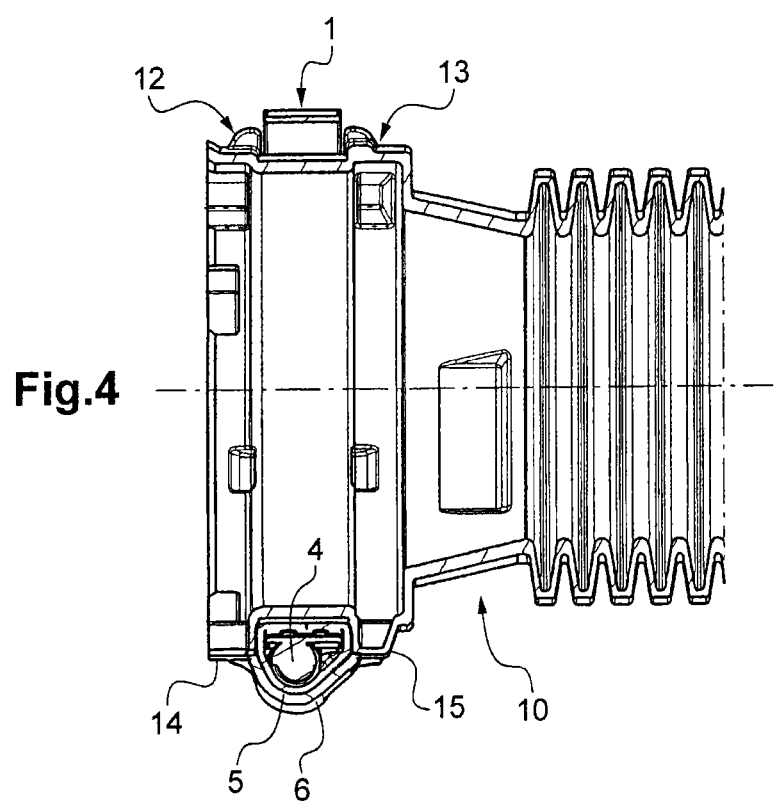
FIG. 4 is an axial cross-sectional view along the plane IV-IV of FIG. 3 of this duct equipped with this clamping collar.

As illustrated in FIG. 2, the two fins 7a and 7b make it possible to obtain a rotation stopping surface against the respective abutments 14 and 15 of the rims 14 and 15 of the duct 10 which is increased, in comparison to the stopping surfaces of the prior art.

As for the immobilization portion 9, it can be seen in FIG. 3 that it is formed by a through orifice 9a formed in the cover 6 in the direction X of its radial thickness and which is passed through by this end 4b of the screw 4, which end 4b, terminating at the end of the cover 6 through the orifice 9a, makes it possible to lock this cover 6 because it abuts against the edge of this orifice 9a.

To sum up, this cover 6 according to the invention makes it possible to ensure a very satisfactory rotational blocking of the collar 1 on the duct 10 without the risk of holing the latter because of the rotational abutment which is exclusively provided by the plastic material of the cover 6 covering the clamping member 3, which makes it possible to use lesser thicknesses of material for the groove rims 12 and 13. Furthermore, this cover 6 does not degrade the clamping performance of the collar 1, the clamping torque being fully transmitted to the duct 10 and to the nozzle that it connects. Finally, it may be noted that this cover 6 makes it possible to increase the tightening tolerances of the collar 1 by comparison to the collars of the prior art.

Generally, it will also be noted that the or each abutment portion 7a, 7b of the rotational blocking means 6 (i.e., in the example illustrated, each fin 7a, 7b of the cover 6) is formed radially above the external overlapping face of the strip 2 of the collar 1 according to the invention, and that the latter is not fixed permanently to the duct 10 (i.e. without gluing or welding).

The invention claimed is:

1. A polymer duct configured to be connected to a nozzle of a system for transporting a fluid, the duct comprising a circumferential groove into which is mounted a clamping collar configured to clamp the duct against the nozzle, the groove being delimited by two lateral rims comprising radially projecting lateral studs with which the collar cooperates to be rotationally blocked relative to the duct, wherein the clamping collar comprises:

a circumferential clamping strip having two ends which overlap in an overlap region of the strip, the strip having two radially internal and external overlapping faces;

a strip clamping member mounted in contact with said overlapping faces, and a non-metallic blocking cover having an abutment portion and mounted on the strip clamping member for blocking the rotation of the clamping collar in the groove by rotational abutment of the abutment portion against said studs, wherein said blocking cover bears on said external overlapping face and covers the clamping member radially outside said external overlapping face, and wherein the abutment portion comprises at least one pair of lateral fins which extend in the radial and axial directions and radially above said external overlapping face, both lateral fins of said at least one pair of lateral fins abutting against axial and lateral faces of two of said lateral studs respectively formed on both rims of said groove.

2. The duct according to claim 1, wherein said axial fins comprise substantially square or trapezoidal wings which are symmetrical to one another in relation to the median plane of the clamping strip in the circumferential direction.

3. The duct according to claim 1, wherein said blocking cover is clipped onto the clamping member.

4. The duct according to claim 3, wherein said clamping member comprises a cage having a screw, and wherein the blocking cover comprises a clipping portion clipped onto a convex surface of the cage, the convex surface being substantially in the form of an arc of a cylinder and defining a radially external part of the clamping member.

5. The duct according to claim 4, wherein said clipping portion is formed at one end of said blocking cover, the end being adjacent the head of the screw, wherein the clipping portion has an inverted U-shape with two deformable clipping lips.

6. The duct according to claim 5, wherein said clipping portion is separated from said pair of axial fins by two notches that mechanically separate the clipping portion from the abutment portion.

7. The duct according to claim 5, wherein said blocking cover further comprises, at an end opposite the clipping portion, an immobilization portion which abuts the end of the screw to immobilize the blocking cover.

8. The duct according to claim 1, wherein said blocking cover comprises a one piece injection molded thermoplastic part.

* * * * *